US009636581B2

(12) United States Patent
Tait

(10) Patent No.: US 9,636,581 B2
(45) Date of Patent: May 2, 2017

(54) INFORMATION PROCESSING APPARATUS, CONTROL METHOD, PROGRAM, STORAGE MEDIUM, AND RENDERING SYSTEM

(71) Applicant: SQUARE ENIX HOLDINGS CO., LTD., Tokyo (JP)

(72) Inventor: Alex Tait, Montreal (CA)

(73) Assignee: SQUARE ENIX HOLDINGS CO., LTD., Tokyo (JP)

(*) Notice: Subject to any disclaimer, the term of this patent is extended or adjusted under 35 U.S.C. 154(b) by 269 days.

(21) Appl. No.: 14/382,409

(22) PCT Filed: Jan. 29, 2014

(86) PCT No.: PCT/JP2014/052594
§ 371 (c)(1),
(2) Date: Sep. 2, 2014

(87) PCT Pub. No.: WO2014/123129
PCT Pub. Date: Aug. 14, 2014

(65) Prior Publication Data
US 2015/0038224 A1 Feb. 5, 2015

Related U.S. Application Data

(60) Provisional application No. 61/761,415, filed on Feb. 6, 2013.

(51) Int. Cl.
*A63F 9/24* (2006.01)
*A63F 13/355* (2014.01)
(Continued)

(52) U.S. Cl.
CPC .......... *A63F 13/355* (2014.09); *A63F 13/12* (2013.01); *A63F 13/52* (2014.09); *G06T 17/00* (2013.01); *A63F 2300/406* (2013.01)

(58) Field of Classification Search
None
See application file for complete search history.

(56) References Cited

U.S. PATENT DOCUMENTS 6,672,961 B1 1/2004 Uzun
2007/0167239 A1 7/2007 O'Rourke
(Continued)

FOREIGN PATENT DOCUMENTS

| CA | 2692064 | 8/2011 |
| JP | 2002-248273 | 9/2002 |

(Continued)

OTHER PUBLICATIONS

International Search Report (ISR) in International Patent Application No. PCT/JP2014/052594, dated Mar. 25, 2014.
(Continued)

*Primary Examiner* — Paul A D'Agostino
(74) *Attorney, Agent, or Firm* — Greenblum & Bernstein, P.L.C.

(57) ABSTRACT

An information processing apparatus receives operation input corresponding to a plurality of devices and renders a first screen for a particular viewpoint in a virtual space in which it is possible to move an avatar based on the operation input, wherein avatars corresponding to each of the plurality of devices are simultaneously positioned in the virtual space. Meanwhile, the apparatus also performs processing on particular content that is not an avatar based on the operation input and renders a second screen for the content. The apparatus, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

24 Claims, 11 Drawing Sheets

(51) Int. Cl.
*A63F 13/52* (2014.01)
*G06T 17/00* (2006.01)
*A63F 13/30* (2014.01)

(56) References Cited

U.S. PATENT DOCUMENTS

| | | |
|---|---|---|
| 2008/0045338 A1 | 2/2008 | Walker et al. |
| 2008/0307473 A1 | 12/2008 | Allen |
| 2009/0023496 A1 | 1/2009 | Kataoka |
| 2012/0028700 A1* | 2/2012 | Avent ............... A63F 13/12 463/23 |
| 2012/0190453 A1* | 7/2012 | Skaff ............... A63H 3/28 463/41 |
| 2012/0190458 A1* | 7/2012 | Gerson ............... A63F 13/77 463/42 |
| 2012/0270652 A1 | 10/2012 | Kim et al. |
| 2013/0116044 A1* | 5/2013 | Schwartz ............... A63F 13/12 463/29 |

FOREIGN PATENT DOCUMENTS

| | | |
|---|---|---|
| JP | 2009-022365 | 2/2009 |
| KR | 10-0678994 | 2/2007 |

OTHER PUBLICATIONS

Screen Shot from Dead or Alive, DOA4 Online League Tournament (Waiting in Lobby), screen shot taken from http://www.youtube.com/watch?v=RhGJlnUtDrU, dated Nov. 5, 2012.
Screen Shot from Dead or Alive, Dead or Alive 4—Lobby TVs, screen shot taken from http://www.youtube.com/watch?v=RhGJlnUtDrU, dated Nov. 5, 2012.
Screen Shot from Arcade Home Port Review: Pinball Hall of Fame: The Williams Collection, screen shot taken from http://www.youtube.com/watch?v=43GVduKao7k, dated Nov. 5, 2012.
Video of "Dead or Alive" Waiting Lobby, Dead or Alive 4—Lobby TVs, available at http://www.youtube.com/watch?v=wjaw3N__jwpg, accessed on Dec. 1, 2014.
European Search Report from European Patent Office (EPO) in European Patent Appl. No. 14749202.9, dated Nov. 21, 2016.

* cited by examiner

INFORMATION PROCESSING APPARATUS, CONTROL METHOD, PROGRAM, STORAGE MEDIUM, AND RENDERING SYSTEM

CLAIM FOR PRIORITY

This application is a U.S. National Stage of PCT/JP2014/052594 filed on Jan. 29, 2014, and claims the priority benefit of U.S. provisional application 61/761,415, filed Feb. 6, 2013, the contents of which is expressly incorporated by reference herein in its entirety.

TECHNICAL FIELD

The present invention relates to an information processing apparatus, a control method, a program, a storage medium, and a rendering system, and in particular to a screen composing technique for screens of a virtual space in which a plurality of people can simultaneously participate.

BACKGROUND ART

Video games have become a common source of entertainment for virtually every segment of the population. The video game industry has seen considerable evolution, from the introduction of stand-alone arcade games, to home-based computer games and the emergence of games made for specialized consoles.

Meanwhile content, such as video games, in which provided screens are rendered by an apparatus, is not limited to specialized consoles and can be provided for general information processing apparatuses such as PCs and smartphones as well. In recent years, many common information processing apparatus including game consoles have a connectivity functions for connecting to a network such as the Internet, and the aforementioned contents have the ability to provide services and entertainment using network communication. For example, one kind of service that uses network communication is a massively multiplayer type network game such as an MMORPG (Massively Multiplayer Online Role-Playing Game), for example.

Also, in recent years, provision system exist in which rather than performing execution of screen rendering on a user apparatus, screens are rendered on a connected external apparatus such as a server. In such as case, a similar provision experience to a case where the user apparatus renders the screens can be realized by the user apparatus receiving and displaying data of screens rendered by the external apparatus. So-called cloud-based rendering systems, in which screen provision by such kinds of external apparatuses is performed via a network such as the Internet to which many users can simultaneously connect, having been getting attention in recent years. There exist cloud-based gaming systems that use such systems in the video game industry as well.

In a cloud-based gaming system, a player can utilize an ordinary Internet-enabled device such as a smartphone or tablet to connect to a video game server on the Internet. The video game server starts a session for the player and renders images for the player based on selections (e.g., moves, actions) made by the player and other attributes of the game. The images are delivered to the player's device over the Internet, and are reproduced on the display. In this way, players from anywhere in the world can play a video game without the use of specialized video game consoles, software or graphics processing hardware.

SUMMARY OF INVENTION

The present invention provides an information processing apparatus, a control method, a program, a storage medium and a rendering system for improving user experiences in a virtual space in which a plurality of users can simultaneously participate.

Various non-limiting aspects of the invention are set out in the following clauses:

The present invention in its first aspect provides an information processing apparatus for rendering screens provided to a plurality of apparatuses, comprising: reception means for receiving operation input corresponding to the plurality of apparatuses; first rendering means for rendering a first screen for a particular viewpoint in a virtual space in which it is possible to move an avatar based on the operation input, wherein avatars corresponding to each of the plurality of apparatuses are simultaneously positioned in the virtual space; second rendering means for performing processing on particular content that is not an avatar based on the operation input and rendering a second screen for the content; and management means for managing management information indicating which of the first rendering means and the second rendering means to cause to render a screen to be provided to an apparatus in the plurality of apparatuses, wherein the first rendering means, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

The present invention in its second aspect provides a method of controlling an information processing apparatus for rendering screens provided to a plurality of apparatuses, comprising: a receiving step of reception means of the information processing apparatus receiving operation input corresponding to the plurality of apparatuses; a first rendering step of first rendering means of the information processing apparatus rendering a first screen for a particular viewpoint in a virtual space in which it is possible to move an avatar based on the operation input, wherein avatars corresponding to each of the plurality of apparatuses are simultaneously positioned in the virtual space; a second rendering step of second rendering means of the information processing apparatus performing processing on particular content that is not an avatar based on the operation input and rendering a second screen for the content; and a managing step of management means of the information processing apparatus managing management information indicating with which of the first rendering step and the second rendering step to use to render a screen to be provided to an apparatus in the plurality of apparatuses, wherein the first rendering means in the first rendering step, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

The present invention in its third aspect provides a rendering system comprising an information processing apparatus and a rendering apparatus for rendering screens provided to a plurality of apparatuses connected to the information processing apparatus, wherein the information processing apparatus comprises: reception means for receiving operation input corresponding to the plurality of apparatuses; and instruction means for making a rendering instruction to the rendering apparatus based on the operation input received by the reception means, and wherein the rendering apparatus comprises: first rendering means for rendering a first screen for a particular viewpoint in a virtual space in which it is possible to move an avatar based on the operation input, wherein avatars corresponding to each of the plurality of apparatuses are simultaneously positioned in the virtual space; and second rendering means for performing processing on particular content that is not an avatar based on the operation input and rendering a second screen for the content, and wherein either the information processing apparatus or the rendering apparatus further comprises management means for managing management information indicating which of the first rendering means and the second rendering means to cause to render a screen to be provided to an apparatus in the plurality of apparatuses, and wherein the first rendering means, in a case where an avatar corresponding to an apparatus to which the second screen is provided is included in a rendering scope for the particular viewpoint, renders the first screen, applying the second screen, provided to the apparatus corresponding to the avatar, to an object related to the avatar in the virtual space.

Further features of the present invention will become apparent from the following description of exemplary embodiments (with reference to the attached drawings).

It is to be expressly understood that the description and drawings are only for the purpose of illustration of certain embodiments of the invention and are an aid for understanding. They are not intended to be a definition of the limits of the invention.

DESCRIPTION OF EMBODIMENTS

Detailed explanation for explanatory embodiments of the present invention will be give with reference to the drawings. Note, in the embodiments explained below, examples of an information processing apparatus and a rendering system wherein the present invention is adopted to a server system capable of rendering game screens or screens for a virtual space provided to a plurality of client devices. However, the present invention can also be adopted to various devices that can render screens provided to a plurality of apparatuses. In other words, the present invention is no limited to an apparatus or system that provides rendered game screens.

I. Cloud Gaming Architecture

Figure 1:
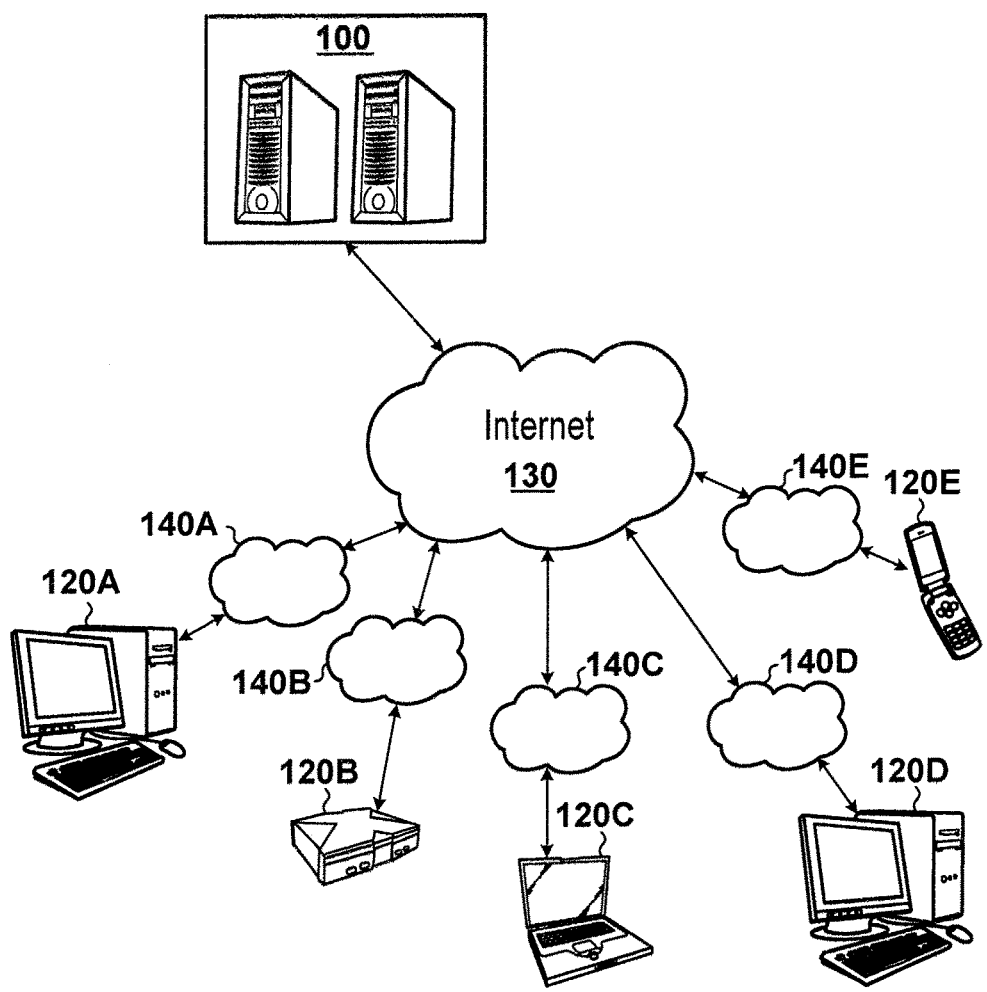
FIG. 1 is a block diagram of a video game system architecture, according to a non-limiting embodiment of the present invention.

FIG. 1 schematically shows a video game system architecture according to a non-limiting embodiment of the present invention, including a server system (or "server arrangement") 100 for delivering video game services over the Internet 130. Individual client devices 120A, 120B, 120C, 120D, 120E can connect to the server system 100 by communication pathways established over a respective local access network 140A, 140B, 140C, 140D, 140E and the Internet 130. The server system 100 may itself be connected to the Internet 130 by an access network, although to minimize latency, the server system 100 may connect directly to the Internet 130 without the intermediary of an access network. Alternatively, the server system 100 and the client devices 120A, 120B, 120C, 120D, 120E may be configured to be connected wirelessly or with wires without going through the Internet 130 or the local access networks 140A, 140B, 140C, 140D, or 140E.

As will become apparent from the description herein below, the server system 100 may be configured so as to enable users of the client devices 120A, 120B, 120C, 120D, 120E to play a video game, either individually (i.e., a single-player video game) or in groups (i.e., a multiplayer video game). Non-limiting examples of video games may include games that are played for leisure, education and/or sport. A video game may but need not offer participants the possibility of monetary gain.

The server system 100 may comprise a single server or a cluster of servers connected through, for example, a virtual private network (VPN) and/or a data center. Individual servers within the cluster may be configured to carry out specialized functions. For example, one or more servers in the server system 100 may be primarily responsible for graphics rendering.

Figure 2A:
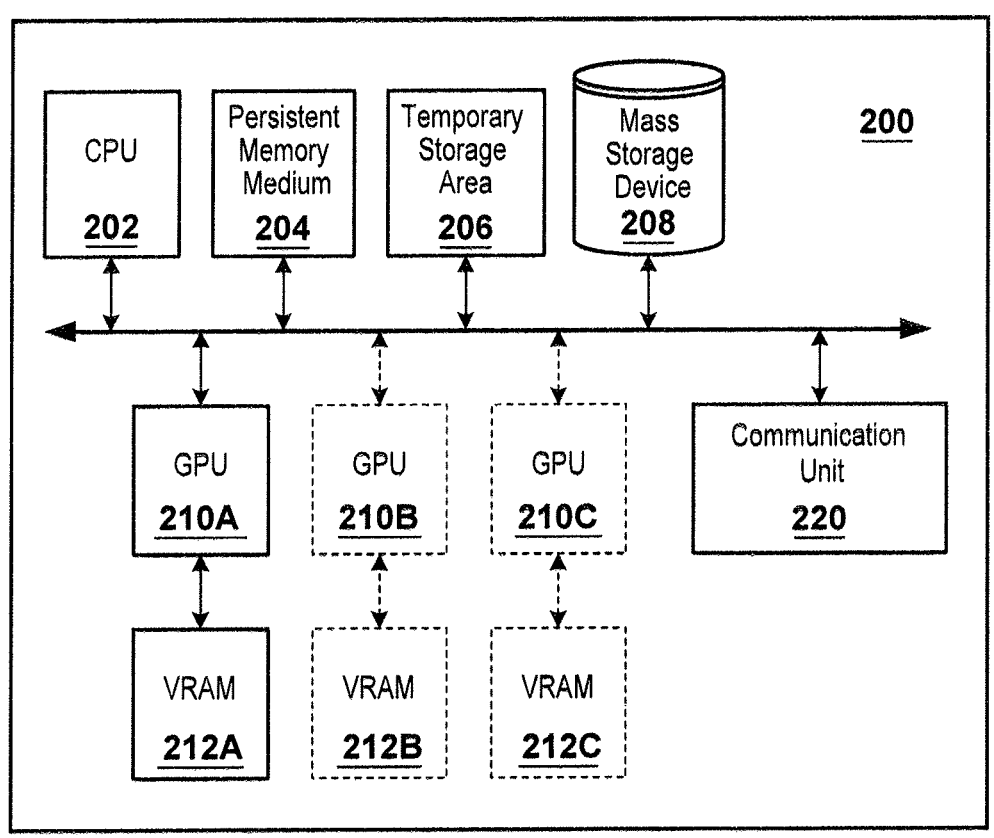
FIG. 2A is a block diagram showing various functional modules of a server system used in the video game system architecture of FIG. 1, according to one non-limiting embodiment of the present invention.
Figure 2B:
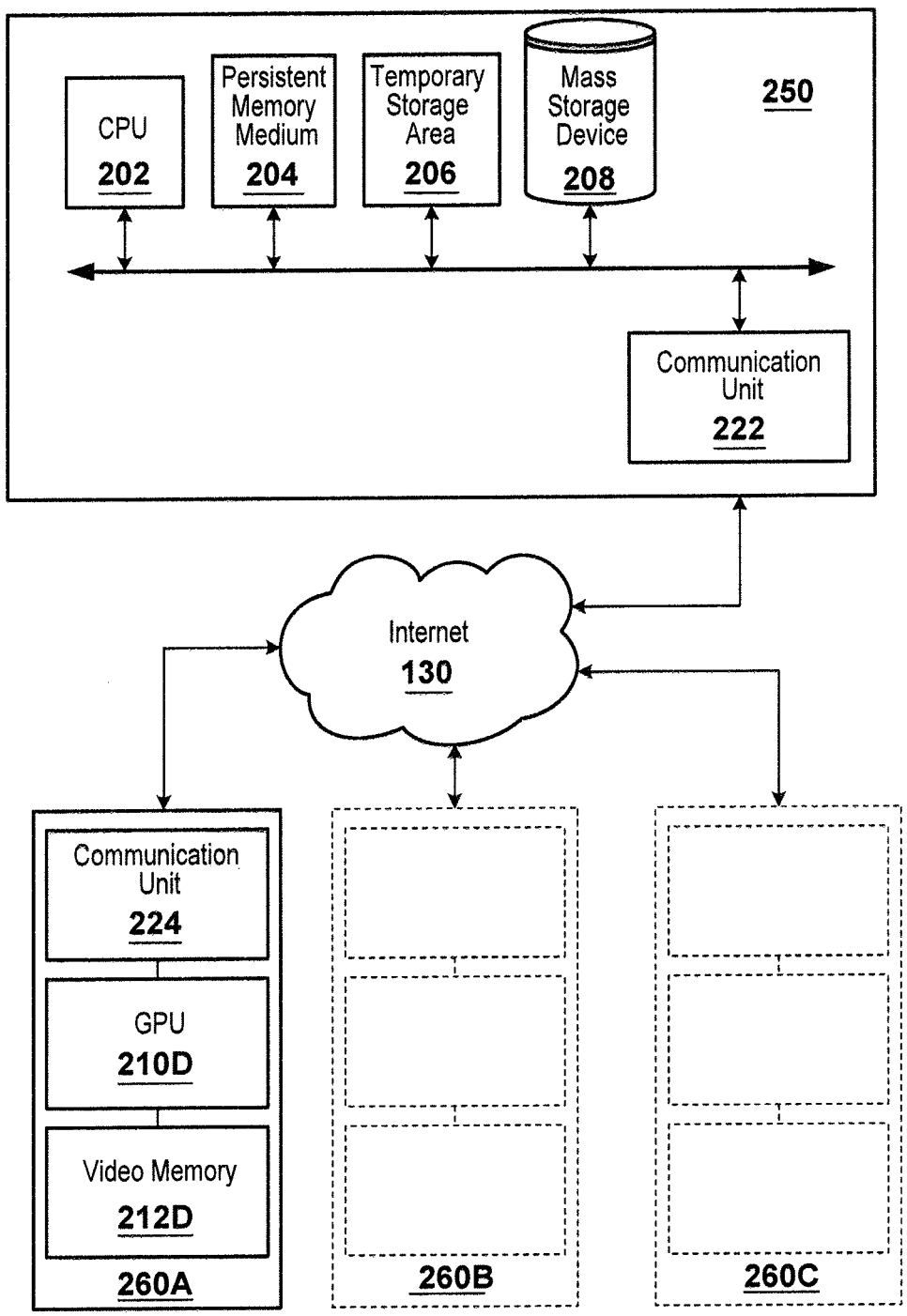
FIG. 2B is a block diagram showing various functional modules of a server system used in the video game system architecture of FIG. 1, according to another non-limiting embodiment of the present invention.

FIGS. 2A and 2B illustrate two different non-limiting embodiments of the server system 100. In both cases, the server system 100 includes at least one server 200, 250 with a central processing unit (CPU) 202. The CPU 202 may load service providing programs into a temporary storage area 206 from a persistent memory medium 204 or from a mass storage device 208. In a non-limiting embodiment, the temporary storage area 206 may be a volatile random-access memory (RAM) such as SRAM or DRAM. In a non-limiting embodiment, the persistent memory medium 204 may be a programmable non-volatile memory such as EEPROM. Also, in addition to storing the service providing program, the persistent memory medium 204 may store other sets of program (such as operating system) and/or data required for the operation of various modules of the server 200, 250. In a non-limiting embodiment, the mass storage device 208 may be an internal hard disk drive or a Flash memory detachable from the server 200, 250. In another embodiment, the mass storage device 208 may be accessible to the server 200, 250 over the Internet 130. The mass storage device 208 may also serve as a database for storing information about participants involved in the video game, as well as other kinds of information that may be required to generate output for the various participants in the video game.

Once the service providing programs are loaded into the temporary storage area 206, they may be executed by the CPU 202. The service providing programs may include instructions for generating screens for various viewpoints in a virtual space in which a plurality of user participate, and in which avatars corresponding to the users can be moved by making operations. The service providing programs may include instructions for generating game screens for a case where a user simply executes a single-player game or a head-to-head game. Data necessary for generation of the screens may be stored in, for example, the mass storage device 208. The rendering of game screens may be executed by invoking one or more specialized processors referred to as graphics processing units (CPUs). Depending on the embodiment, the GPUs may be co-located with the CPU 202 within the server 200 or they may be located on a separate server connected to the server 200 over the Internet 130.

FIG. 2A pertains to the case where graphics rendering capabilities are located within the same server 200 as the CPU 202 that executes the service providing program. Each video memory (e.g., VRAM) 212A, 212B, 212C may be connected to a respective GPUs 210A, 210B, 210C, and may provide temporary storage of picture element (pixel) values for display of a game screen. When performing rendering, data for one or more objects to be located in three-dimensional space may be loaded into a cache memory (not shown) of the GPU 210A, 210B, 210C. This data may be rendered by the GPU 210A, 210B, 210C as data in two-dimensional space (e.g., an image), which may be stored in the video memory 212A, 212B, 212C. The image is then output towards a recipient client device over the Internet 130.

The server 200 also provides a communication unit 220, which may exchange data with the client devices 120A, 120B, 120C, 120D, 120E over the Internet 130. Specifically, the communication unit 220 may receive user inputs from the client devices 120A, 120B, 120C, 120D, 120E over the Internet 130 and may transmit data (e.g. screen data) to the client devices 120A, 120B, 120C, 120D, 120E over the Internet 130. The data transmitted to the client devices 120A, 120B, 120C, 120D, 120E may include encoded images of screens or portions thereof. Where necessary or appropriate, the communication unit 220 may convert data into a format compliant with a suitable communication protocol.

FIG. 2B pertains to the case where graphics rendering capabilities are distributed among one or more rendering server(s) 260A, 260B, 260C that are separate from a control server 250. The control server 250 and the rendering servers 260A, 260B, 260C can be connected over a network such as the Internet 130. In an embodiment, there may be one or several rendering servers 260A, 260B, 260C, and in the case where there is more than one rendering server, the rendering servers 260A, 260B, 260C may be distributed over any suitable geographic area. In the case of FIG. 2B, the communication unit 222 may transmit control instructions to the rendering servers 260A, 260B, 260C over the Internet 130.

The rendering server 260A comprises a GPU 210D, a video memory (e.g., VRAM) 212D, a CPU 213D (not shown) and a communication unit 224. The communication unit 224 receives the control instructions from the control server 250 over the Internet 130. Based on these control instructions, the CPU 213D performs necessary processing and causes the GPU 210D to execute screen rendering processing. The rendered screen data are stored in a video memory 212D and then encoded and transmit towards a recipient client device over the Internet 130 via the communication unit 224. Alternatively, the rendered screen data is the transmitted via the control server 250 to a recipient client device. Similarly to the case of FIG. 2A, the communication unit 224 may convert data into a format compliant with a suitable communication protocol.

Turning now to the client devices 120A, 120B, 120C, 120D, 120E, their configuration is not particularly limited. In some embodiments, one or more of the client devices 120A, 120B, 120C, 120D, 120E may be, for example, a PC, a home-use game machine (console such as XBOX™, PS3™, Wii™, etc.), a portable game device, a smart television, a set-top box (STB), etc. In other embodiments, one or more of the client devices 120A, 120B, 120C, 120D, 120E may be a communication or computing device such as a mobile phone, a PDA, or a tablet.

Figure 3:
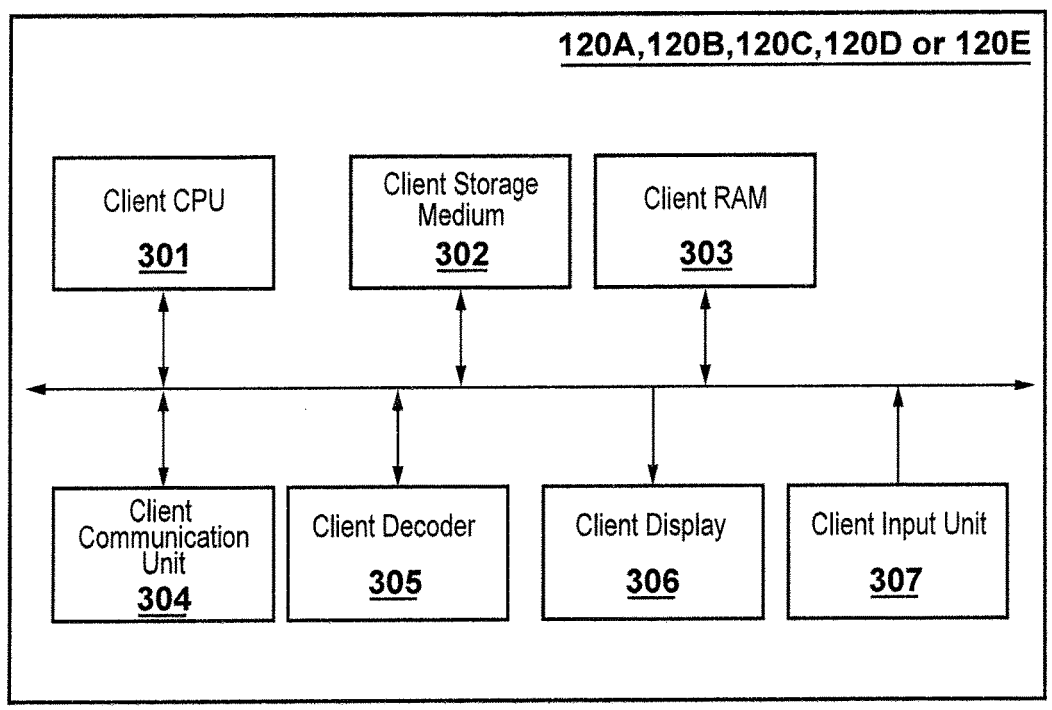
FIG. 3 is a block diagram showing various functional modules of a client device used in the video game system architecture of FIG. 1, according to one non-limiting embodiment of the present invention.

FIG. 3 shows a general client device configuration for explaining explanatory embodiments of the present invention. A client CPU 301 controls operation of blocks comprised in the client device. The client CPU 301 controls operation of the blocks by reading out operation programs for the blocks stored in a client storage medium 302, loading them into a client RAM 303 and executing them. The client storage medium 302 may be an HDD, a non-volatile ROM, or the like. Also, operation programs may be dedicated applications, browsing applications or the like. The client RAM 303 may not just be a program loading area, and may also be used as a storage area for temporarily storing such things as intermediate data output in the operation of any of the blocks.

A client communication unit 304 is a communication interface comprised in the client device. In the present embodiment, the client communication unit 304 receives encoded screen data of the provided service from the server system 100 via the Internet 130. Also, the client communication unit 304 transmits information of operation input by the user on a client device via the Internet 130 to the server system 100. The client decoder 305 decodes encoded screen data received by the client communication unit 304 and generates screen data. The generated screen data is presented to the user of the client device by being output to a client display 306 and displayed. Note, it is not necessary that the client device has the client display 306, and the client display 306 may be an external display apparatus connected to the client device.

The client input unit 307 is a user interface comprised in the client device. The client input unit 307 may include input devices (such as a touch screen, a keyboard, a game controller, a joystick, etc.), and detect operation input by the user. For the detected operation input, integrated data may be transmitted via the client communication unit 304 to the server system 100, and may be transmitted as information indicating that a particular operation input was performed after analyzing the operation content. Also, the client input unit 307 may include other sensors (e.g., Kinect™) that includes a camera or the like, that detect as operation input a motion of a particular object, or a body motion made by the user. In addition, each of the client devices may include a loudspeaker for outputting audio.

II. Types of Screens Provided by the Server System

In the server system of the present embodiment, as explained previously, 2 types of screens: i) screens for a virtual space, and ii) game screens for when the user performs game play are provided to the client device.

Here, explanation of an outline of services provided by the server system of the present embodiment to the client device user will be given.

Figure 7A:
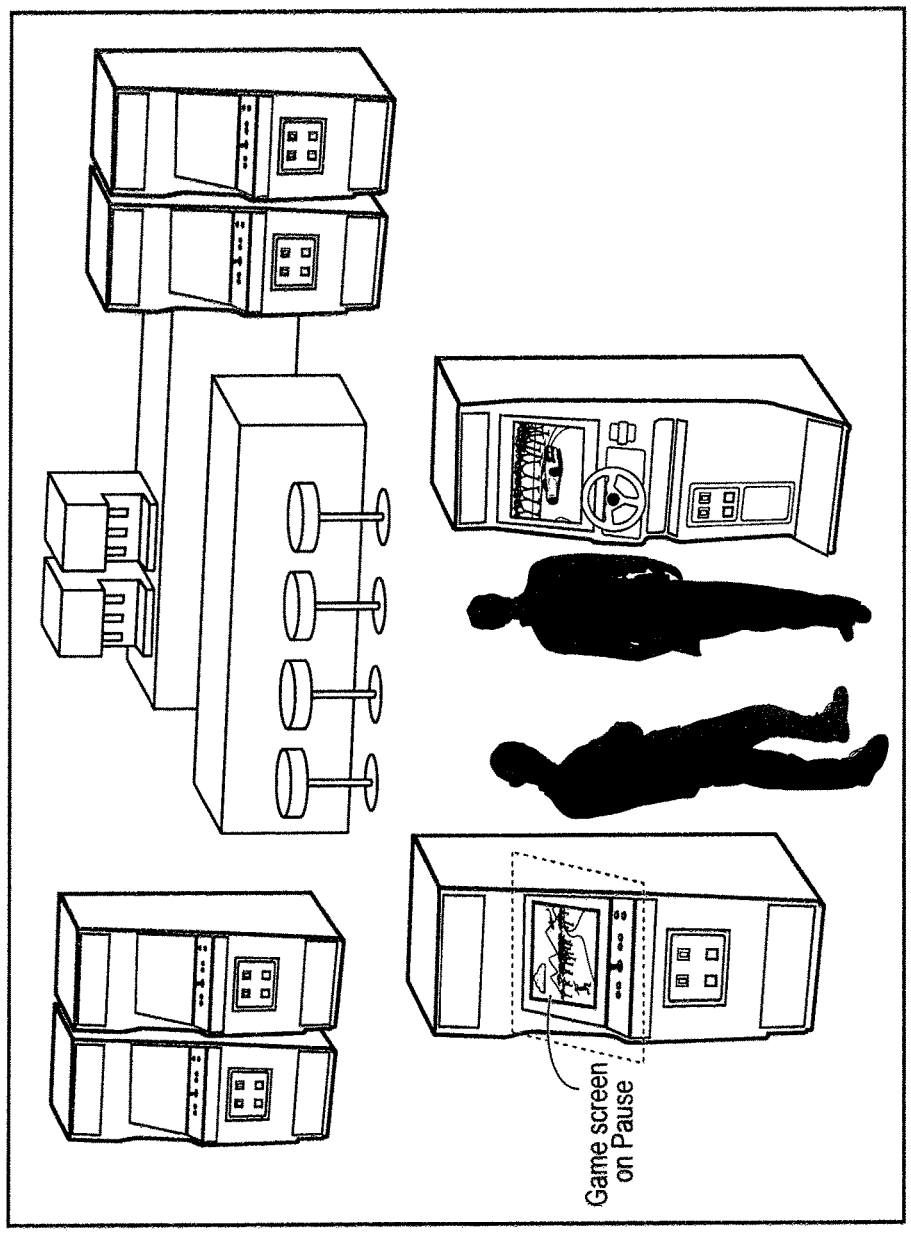
FIGS. 7A to 7D show example screens to be provided to client devices.

The server system provides, as a user communication area, a virtual space that a plurality of client device users can simultaneously participate in (FIG. 7A). This virtual space need not be provided as a game, and may be taken something having visual effect that is used as a tool for simply supporting communication or improving user experiences for communication. Each user can operate and move within the space a corresponding avatar which is positioned in the virtual space.

When a user operates an avatar in the virtual space, a screen for a viewpoint set in the space is provided to the client device of the user. The viewpoint may be selected from among preset fixed viewpoints, or may be selectively changeable by the user, or be something that is changed in accordance with movement (rotation) operation on the avatar by the user.

Figure 7B:
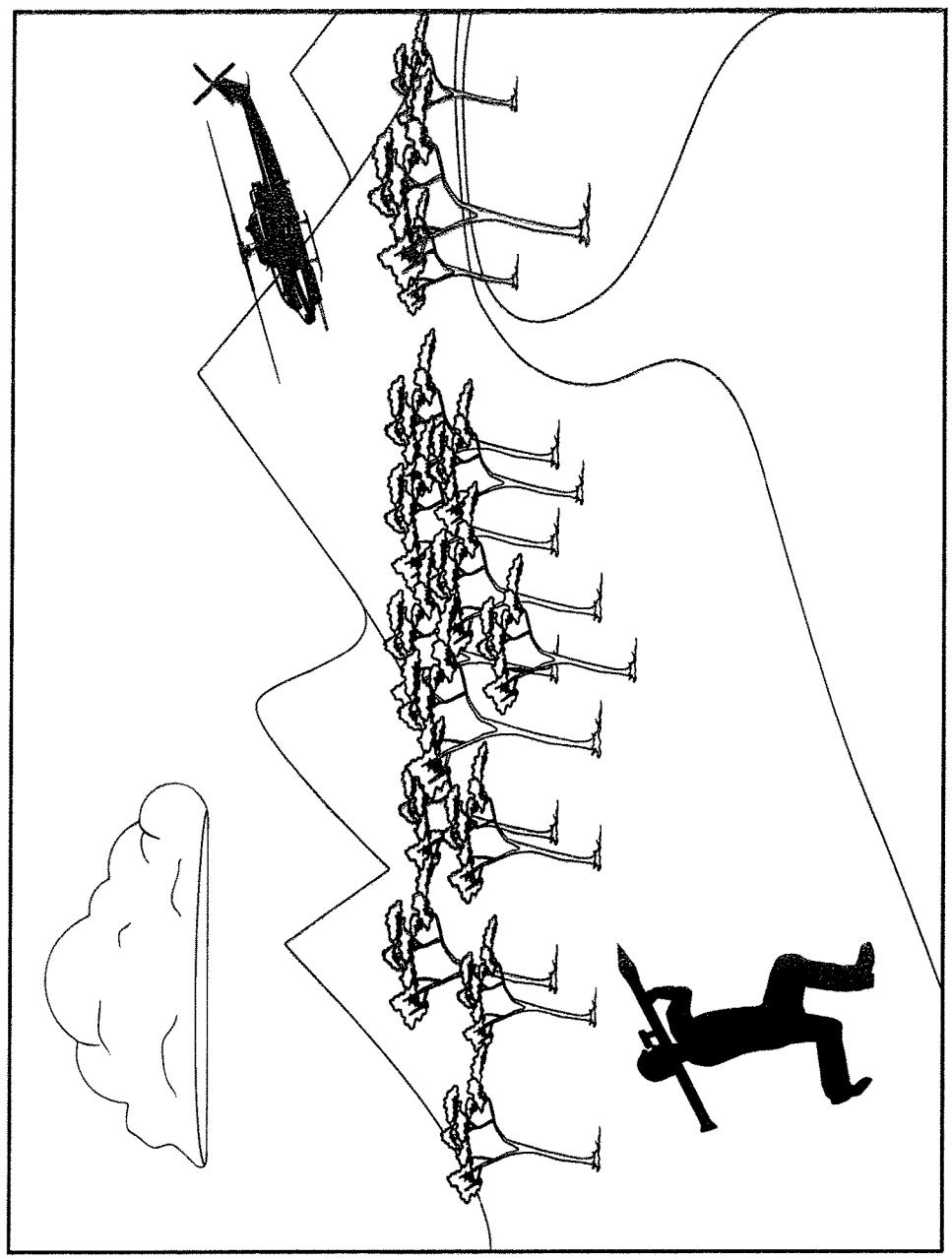

In the present embodiment, the virtual space is assumed to be a place such as an amusement arcade. A user is not only able to cause an avatar to walk around in the space, but is also able, by causing the avatar to move to a position corresponding to an arcade video game machine object arranged in the space, to play a game assigned to that machine (FIG. 7B). In this case, in place of screens of the virtual space, game screens for the game being played are provided to the client device of the user.

Figure 7C:
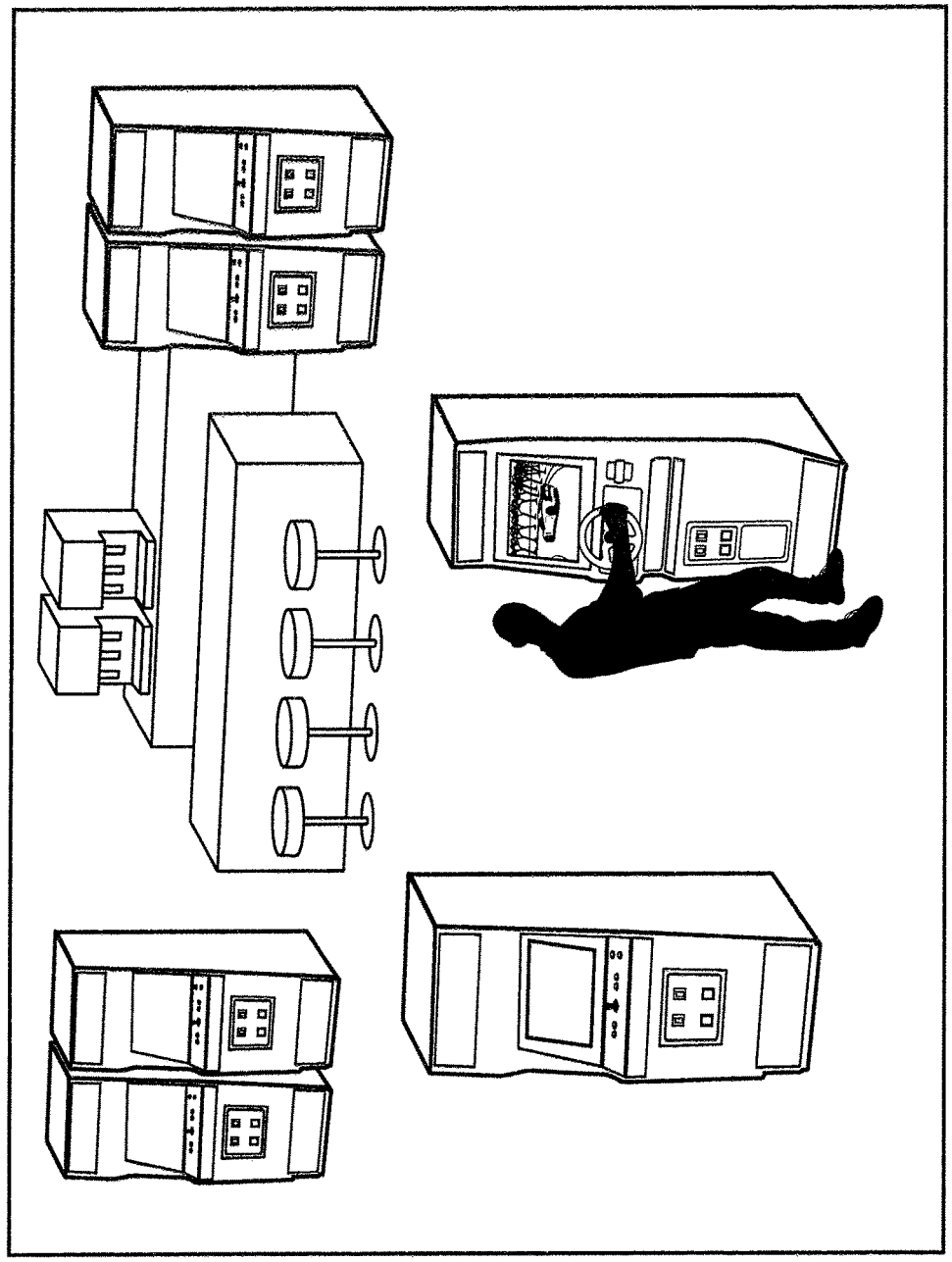

As shown in FIG. 7C, the game screens may be screens provided for a full screen of the client device, for example. While the user is playing a game of the arcade video game machine, operation performed by the user on the client device is recognized as operation for the game and not for movement of the avatar in the virtual space. When the server system receives this operation, it executes processing necessary for the game, updates parameters within the game, and renders a game screen for a next frame.

Figure 7D:
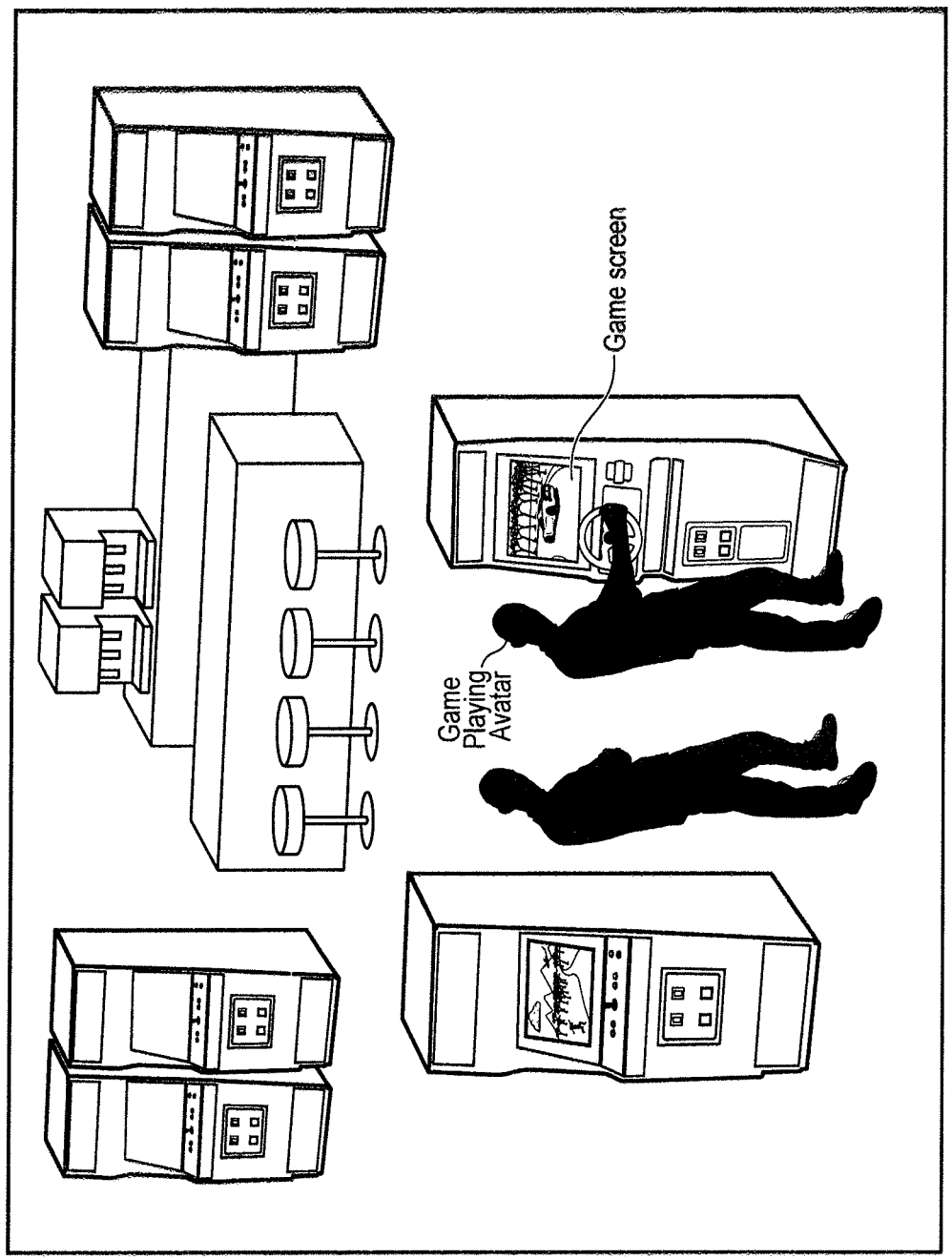

Note, the arcade video game machine object has a part corresponding to a display. In a case where in a screen of the virtual space an avatar of a user is playing a game, a game screen being provided to the user may be applied as a texture to the display unit of the arcade video game machine arranged in front of the avatar, for example. In other words, a user being provided screens of the virtual space can see the game play of other users in the space, just like in a real amusement arcade (FIG. 7D). Because information of operation input from the client device of a user performing game play is being received, the hands of the avatar of the user may also be moved in accordance with the operation input. With this, a user being provided screens of the virtual space can see not only the screens of the game play of another user but also the operation for the game play.

Also, configuration is made such that a user playing a game of an arcade video game machine is capable of stopping or pausing the game from a menu within the game for example. By stopping or pausing, the user once again becomes able to operate the avatar in the virtual space. Note, configuration may be made such that in a case where the game is paused, the user that was playing the game, or a user being provided screens of the virtual space, is able to confirm the paused game screen in the display unit of the arcade video game machine corresponding to the screen in the virtual space. In other words, the server system retains the rendered game screen when the pause was performed, for example, as a texture, and subsequently uses it in rendering of the virtual space.

A paused game can be resumed when the avatar of the user that paused the game once again is moved to a position corresponding to the arcade video game machine object. Also, configuration may be made so that, for example, resuming of the game continuing from the paused state is possible when an avatar of another user is moved to the corresponding position, for example.

In the following explanation, the previously described mode in which screens of the virtual space are provided is referred to as communication mode, and the mode in which a game is playable and game screens are provided is referred to as game mode. Also, explanation will be given referring to users and avatars in the communication mode as communication user and communication avatar respectively, and referring to users and avatars in the game mode as playing users and playing avatars respectively.

III. Screen Creation by Server System

As mentioned earlier, the service providing program executed by the CPU 202 renders screen according to the current mode and transmits them to the client devices 120A, 120B, 120C, 120D, 120E.

Figure 4:
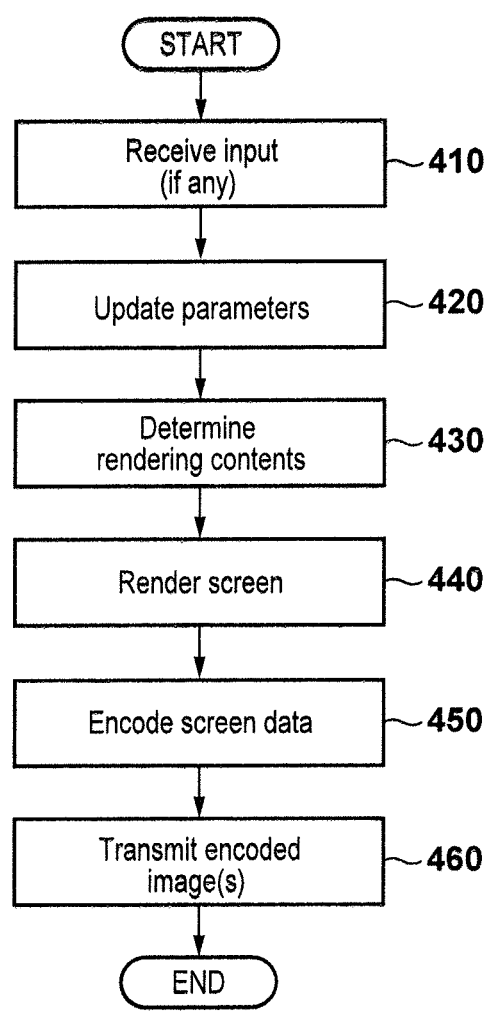
FIG. 4 is a flowchart showing steps in a main processing loop executed by the server system, in accordance with a non-limiting embodiment of the present invention.

Reference is now made to FIG. 4, which conceptually illustrates the steps in a main processing loop (or main game loop) of the service providing program executed by the CPU 202 in the server system 100. The main game loop may be executed for each client device receiving service provision. The main game loop may include steps 410 to 460, which are described below in further detail, in accordance with a non-limiting embodiment of the present invention. The main game loop executes continually at a certain frame rate.

At step 410, the CPU 202 receives information of operation input performed on a client device via the communication unit 220. The operation input may be information of a difference with respect to an input state of a previous frame, for example, and it may be information, detected on the client device, indicating that a particular operation was performed. In some embodiments, and particularly in a multi-player video game, the inputs may include the set of inputs received from all participants in the game, not just the participant for whom the main game loop is being executed. In the case where no inputs have been provided, step 310 may be omitted.

At step 420, the CPU 202 updates various parameters for screen configuration based on received information of operation input. Also, the CPU 202 updates parameters not based on operation input but rater based on information that changes along with the passing of time. The various parameters updated in this step may be, in a case where the current mode is communication mode, information indicating position or stance information of an avatar positioned in the virtual space, for example, or whether or not a game play state has been entered. Also, in a case where the current mode is game mode, for example, the parameters may be for positions of operation characters and NPCs (Non-Player Characters) in the game, or stance information.

At step 430, the CPU 202 determines rendering contents of a screen to be provided to the client device. Specifically, the CPU 202, when the current mode is the communication mode, based on the viewpoint and direction for which the rendering is performed, specifies an object included in the portion of the virtual space that would be "visible" from the perspective originated from the viewpoint, and determines rendering content. Alternatively, the CPU 202, when the current mode is game mode, determines a rendering target and rendering content in accordance with screen configuration defined in the game.

At step 440, the CPU 202, based on rendering content determined in step 430, renders a screen (image) to be provided to a client device with GPU 210A, 210B, 210C, or 210D.

At step 450, the communication unit 220 encodes screen data rendered by a GPU and stored in a VRAM. The encoding is not limited to encoding based on a static image encoding standard, and may be based on a moving image encoding standard. In addition to data compression, the encoding process used to encode a particular image may or may not apply cryptographic encryption.

At step 460, the communication unit 220 transmits the encoded image via the Internet 130 to the client device. In this way, screen creation processing for 1 frame completes.

IV. Screen Reproduction at Client Device

Figure 5:
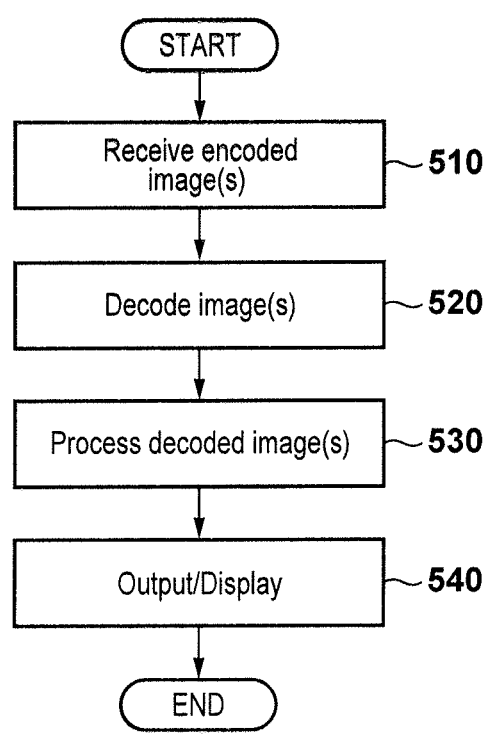
FIG. 5 is a flowchart showing steps taken by a client device to decode, combine and display received images, in accordance with a non-limiting embodiment of the present invention.

Reference is now made to FIG. 5, which shows operation of the client device associated with a given user, which may be any of client devices 120A, 120B, 120C, 120D, 120E.

At step 510, the client CPU 301 receives an encoded image (encoded screen data) from the server system 100 via the client communication unit 304. Any associated audio may also be received at this time.

At step 520, the client decoder 305 decodes the received encoded image. The decompression algorithm is complementary to the compression algorithm used in the encoding process (see, e.g., step 450 above). In a non-limiting embodiment, the identity or version of the compression algorithm used to encode the image may be specified in the content of one or more packets that convey the image.

At step 530, the client CPU 301 processes the (decoded) image. This can include placing the decoded image in a buffer (ex. the client RAM 303), performing error correction, combining multiple successive images, performing alpha blending, interpolating portions of missing image, and so on. The result can be a final image to be presented to the user one per frame.

At step 540, the client CPU 301 outputs the final image to the client display 306 and displays. For example, in the case of video, a composite video frame is displayed on the client display 306. In addition, associated audio may also be played and any other output synchronized with the video frame may similarly be triggered.

V. Specific Description of Non-Limiting Embodiments

A more detailed description of certain non-limiting embodiments of the present invention is now provided.

Figure 6:
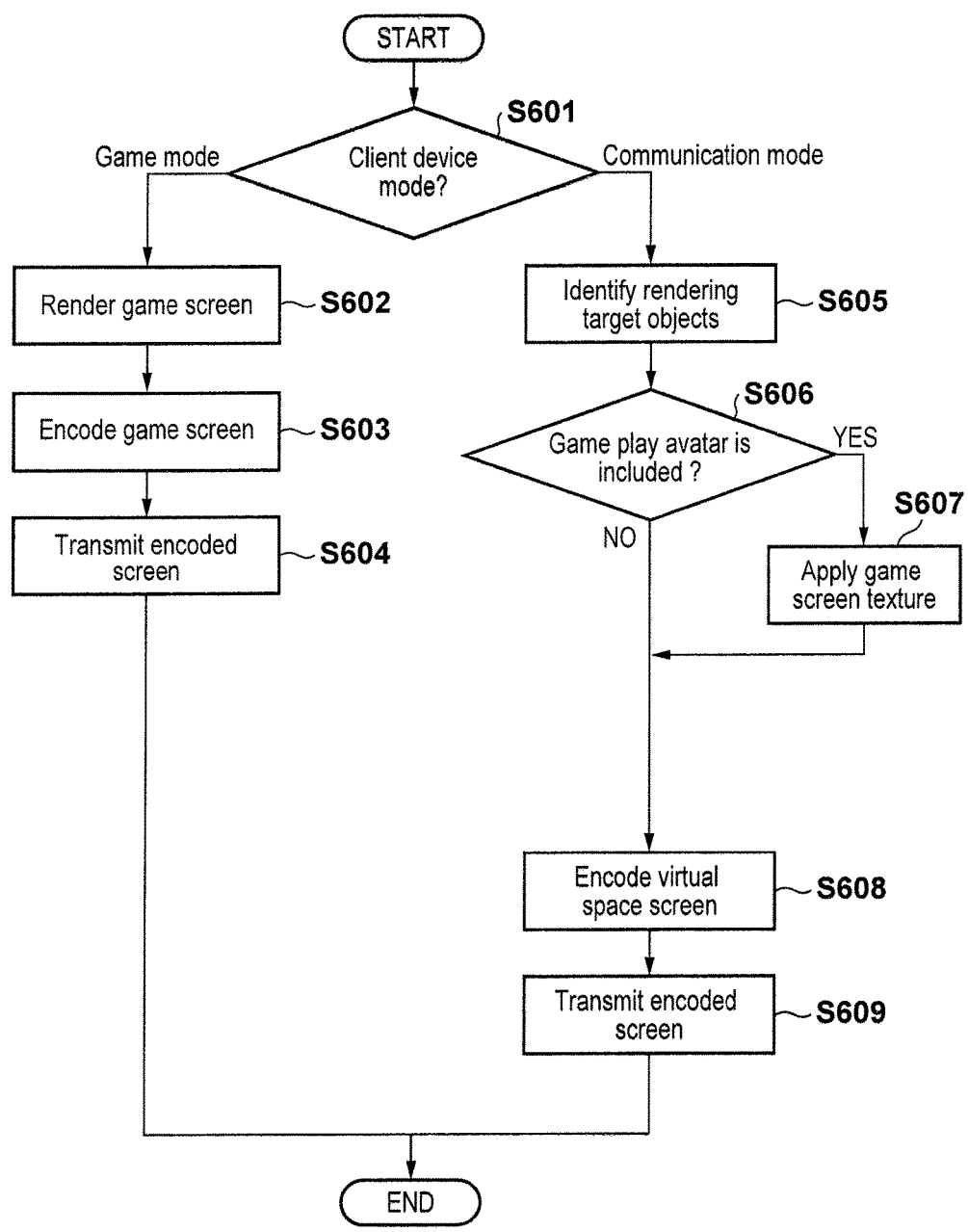
FIG. 6 is a flowchart showing steps in a rendering processing executed by the server system, in accordance with a non-limiting embodiment of the present invention.

FIG. 6 is a flowchart for exemplifying details of rendering processing for a screen that the server system 100 provides to a client device. This processing is performed for generation of one frame in the screen provision, and is executed simultaneously for each of the client devices connected to the server system 100.

In step S601 the CPU 202 determines whether the mode which is set to the client device, to which the screen is provided, is the communication mode or the game mode. The CPU 202 moves the processing to step S605 in a case where it determines that the client device mode is the communication mode, and moves the processing to step S602 in a case where it determines that it is the game mode.

In step S602, the CPU 202, after having executed a game program for a game being played on the client device and performing various processing, causes one of GPU 210A, 210B, 210C, or 210D to render a game screen.

In step S603, the CPU 202 reads outs a game screen stored in a VRAM in the rendering, transmits it to the communication unit 220 and causes encoding processing to be executed. Also, the CPU 202 reproduces the game screen read out from the VRAM and stores the reproduction into a Temporary Storage Area 206.

In step S604, the communication unit 220 transmits the encoded game screen to the client device, and the processing completes.

Meanwhile, in a case where the mode which is set to the client device is determined to be the communication mode in step S601, the CPU 202, in step S605, identifies rendering target objects from out of the objects arranged in the virtual space.

In step S606, the CPU 202 determines whether or not an avatar of another user performing game play is included in the rendering target objects. The CPU 202 moves the processing on to step S607 in a case where it determines that an avatar of another user performing game play is included, and moves the processing to step S608 in a case where it is determined that no such avatar is included.

In step S607, the CPU 202 performs screen rendering, applying a corresponding game screen as a texture to the display unit of the arcade video game machine object on which the game play is performed in the rendering of the screen of the virtual space caused to be performed by one of GPU 210A, 210B, 210C, or 210D. Specifically, the CPU performing the rendering, under the control of the CPU 202, reads data of the corresponding game screen from the Temporary Storage Area 206, loads this into a cache memory of the CPU, and uses it in the rendering. Also, in a case where an arcade video game machine object in a state in which game play is paused is included in the rendering target, rendering is performed applying a corresponding game screen as a texture to the display unit of the object.

In step S608, the CPU 202 reads out a screen of the virtual space stored in a VRAM in the rendering, transmits it to the communication unit 220, causes execution of encoding processing.

In step S609, the communication unit 220 transmits the encoded screen to the client device, and the processing completes.

With this, game screens specific to game play can be provided to a user of a client device in game mode and screens by which it is possible to spectate the game play of another user in the virtual space can be provided to users of client device in the communication mode. In other words, users of client devices in the communication mode can observe that another user in the virtual space is performing game play, and also can observe that game play.

Note, game screens provided to users performing game play are not limited to forms in which they are provided by simply being applied as textures to objects in the virtual space. Configuration may be made so that a user can receive provision of more detailed display of the game screens by performing a selection operation on an avatar in the game play or an arcade video game machine object, for example. In such cases, for example, the game screen and a screen showing the state of the hands of the avatar changing, based on information of the operation input from the client device for the game, may be presented to the user arranged within a single new screen. In this case, the user being provided the game screen and the user being provided the new screen may be able to interact with each other using at least one of audio input and character input. That is, the audio input or the character input is shared with the users, and then the users can be in communication with each other while viewing a same game screen.

Also, as for a texture of a game screen applied to a display unit of an arcade video game machine object, it does not necessarily have to be used in the rendering of a virtual space screen of the same frame as the frame in which the game screen is transmitted. In other words, the game screens used in the rendering of virtual space screens may be game screens transmitted to the client device in a previously transmitted past frame. Accordingly, a plurality of game screens may be accumulated in the Temporary Storage Area 206, used in order in the virtual space screen rendering. By doing this, it is possible to apply interpolation of operation input performed in previous and subsequent frames in a case where a motion is applied in accordance with operation input on an avatar of a user performing game play, for example. In other words, virtual space screens and textures of game screens included in the screens are generated at different timings, and so, by interpolation of discrete data, adjustment can be made to make smooth motion due to operations.

It will be appreciated that by allowing users to participate simultaneously in multiple nested games, certain embodiments of the invention may enable a richer gaming experience than has been previously available.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the method of controlling the information processing apparatus according to the present invention are realizable by a program executing the methods on a computer. The program is providable/distributable by being stored on a computer-readable storage medium or through an electronic communication line.

The invention claimed is:

1. An information processing apparatus for rendering screens provided to a plurality of apparatuses, the information processing apparatus comprising:
   a receiver which is able to receive operation input corresponding to the plurality of apparatuses;
   a first renderer which is able to render a first screen for a particular viewpoint in a virtual space in which it is possible to move an avatar based on the operation input, wherein avatars corresponding to the plurality of apparatuses are simultaneously positioned in the virtual space;
   a second renderer which is able to perform processing on particular content that is not an avatar based on the operation input and render a second screen for the content; and
   a processor which is able to manage management information indicating which of said first renderer and said second renderer to cause to render a screen to be provided to an apparatus in the plurality of apparatuses,
   wherein said first renderer, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

2. The information processing apparatus according to claim 1 wherein said first renderer, in the case where the avatar corresponding to the apparatus to which the second screen is provided is included in the rendering scope for the particular viewpoint, causes a state of the avatar to change in accordance with corresponding operation input and renders the first screen.

3. The information processing apparatus according to claim 1 wherein, said processor,
   in a case where the first screen is being provided, updates, in accordance with a first operation input being performed, the management information to change rendering of screens to be provided to a corresponding apparatus to said second renderer,
   and in a case where the second screen is being provided, updates, in accordance with a second operation input being performed, the management information to change rendering of screens to be provided to a corresponding apparatus to said first renderer.

4. The information processing apparatus according to claim 3 wherein said first renderer, in a case where an avatar corresponding to an apparatus for which rendering of screens to be provided was changed to said first renderer is included in a rendering scope, renders the first screen applying the second screen, which was provided to the apparatus for which rendering was changed, to an object related to the avatar in the virtual space.

5. The information processing apparatus according to claim 3 wherein the first operation input is input of an initiation instruction for provision for an object, which is positioned in the virtual space, related to provision of the particular content.

6. The information processing apparatus according to claim 3 wherein the second operation input is an instruction to stop the provision of the particular content or is an instruction to pause the provision of the particular content.

7. The information processing apparatus according to claim 1 wherein the second screen that said first renderer applies in the case where the avatar corresponding to the apparatus to which the second screen is provided is included in the rendering scope for the particular viewpoint corresponds to a time that is earlier than a time associated with the first screen that is rendered, and is a screen that was previously provided to the apparatus.

8. The information processing apparatus according to claim 1 further comprising third renderer for rendering a third screen, that is different from the first screen, comprising the second screen, which is provided to an apparatus corresponding to an avatar included in a rendering scope for the particular viewpoint and a screen indicating an operation of the avatar in accordance with operation input corresponding to the apparatus, in accordance with the third operation input being performed in a case where first screen is being provided,
   wherein said processor manages management information indicating which of said first renderer, said second renderer and said third renderer to cause to render a screen to be provided to an apparatus in the plurality of apparatuses.

9. The information processing apparatus according to claim 8 further comprising:
   an interface which is able to acquire at least one of audio input and character input from an apparatus to which the third screen is being provided and an apparatus to which the second screen, which is included in the third screen, is being provided, wherein the input acquired by said interface is shared with the apparatus to which the third screen is being provided and the apparatus to which the second screen, which is included in the third screen, is being provided.

10. The information processing apparatus according to claim 8 wherein the third operation input is input of an initiation instruction for sharing of the second screen to an avatar, is positioned in the virtual space, corresponding to an apparatus to which the second screen is being provided.

11. The information processing apparatus according to claim 1 further comprising a transmitter which is able to transmit a screen rendered by any of said renderers to each of the plurality of apparatuses based on the management information.

12. A method of controlling an information processing apparatus for rendering screens provided to a plurality of apparatuses, the method comprising:

receiving, by a receiver of the information processing apparatus, operation input corresponding to the plurality of apparatuses;

rendering, by a first renderer of the information processing apparatus, a first screen for a particular viewpoint in a virtual space in which it is possible to move an avatar based on the operation input, wherein avatars corresponding to the plurality of apparatuses are simultaneously positioned in the virtual space;

performing processing, by a second renderer of the information processing apparatus, on particular content that is not an avatar based on the operation input and rendering a second screen for the content; and managing, by a processor of the information processing apparatus, management information indicating which of the first renderer and the second renderer to use to render a screen to be provided to an apparatus in the plurality of apparatuses, wherein the first renderer, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

13. The method of controlling the information processing apparatus according to claim 12 wherein the first renderer, in the case where the avatar corresponding to the apparatus to which the second screen is provided is included in the rendering scope for the particular viewpoint, causes a state of the avatar to change in accordance with corresponding operation input and renders the first screen.

14. The method of controlling the information processing apparatus according to claim 12 wherein, the processor, in a case where the first screen is being provided, updates, in accordance with a first operation input being performed, the management information to change rendering of screens to be provided to a corresponding apparatus to use the second renderer, in a case where the second screen is being provided, updates, in accordance with a second operation input being performed, the management information to change rendering of screens to be provided to a corresponding apparatus to use the first renderer.

15. The method of controlling the information processing apparatus according to claim 14 wherein the first renderer, in a case where an avatar corresponding to an apparatus for which rendering of screens to be provided was changed to use the first renderer is included in a rendering scope, renders the first screen applying the second screen, which was provided to the apparatus for which rendering was changed, to an object related to the avatar in the virtual space.

16. The method of controlling the information processing apparatus according to claim 14 wherein the first operation input is input of an initiation instruction for provision for an object, which is positioned in the virtual space, related to provision of the particular content.

17. The method of controlling the information processing apparatus according to claim 14 wherein the second operation input is an instruction to stop the provision of the particular content or is an instruction to pause the provision of the particular content.

18. The method of controlling the information processing apparatus according to claim 12 wherein the second screen, that the first renderer applies in the case where the avatar corresponding to the apparatus to which the second screen is provided is included in the rendering scope for the particular viewpoint, corresponds to a time that is earlier than a time associated with the first screen that is rendered, and is a screen that was previously provided to the apparatus.

19. The method of controlling the information processing apparatus according to claim 12 further comprising:

rendering, by a third renderer of the information processing apparatus, a third screen, that is different from the first screen, comprising the second screen, which is provided to an apparatus corresponding to an avatar included in a rendering scope for the particular viewpoint and a screen indicating an operation of the avatar in accordance with operation input corresponding to the apparatus, in accordance with the third operation input being performed in a case where first screen is being provided, wherein the processor manages management information indicating which of the first renderer, the second renderer and the third renderer to cause to render a screen to be provided to an apparatus in the plurality of apparatuses.

20. The method of controlling the information processing apparatus according to claim 19 further comprising:

acquiring, by an interface of the information processing apparatus, at least one of audio input and character input from an apparatus to which the third screen is being provided and an apparatus to which the second screen, which is included in the third screen, is being provided, and sharing, by the interface of the information processing apparatus, input acquired by the interface with the apparatus to which the third screen is being provided and the apparatus to which the second screen, which is included in the third screen, is being provided.

21. The method of controlling the information processing apparatus according to claim 19 wherein the third operation input is input of an initiation instruction for sharing of the second screen to an avatar, positioned in the virtual space, corresponding to an apparatus to which the second screen is being provided.

22. The method of controlling the information processing apparatus according to claim 12 further comprising:

transmitting, by an interface of the information processing apparatus, a screen rendered by any of the renderers to each of the plurality of apparatuses based on the management information.

23. A non-transitory computer-readable storage medium including a program for controlling an information processing apparatus for rendering screens provided to a plurality of apparatuses that, when executed by a computer, causes the computer to perform operations including:
  receiving, by a receiver of the information processing apparatus, operation input corresponding to the plurality of apparatuses;
  rendering, by a first renderer of the information processing apparatus, a first screen for a particular viewpoint in a virtual space in which it is possible to move an avatar based on the operation input, wherein avatars corresponding to the plurality of apparatuses are simultaneously positioned in the virtual space;
  performing processing, by a second renderer of the information processing apparatus, on particular content that is not an avatar based on the operation input and rendering a second screen for the content; and
  managing, by a processor of the information processing apparatus, management information indicating which of the first renderer and the second renderer to use to render a screen to be provided to an apparatus in the plurality of apparatuses,
  wherein the first renderer, in a case where an avatar corresponding to an apparatus to which the second screen is provided is included in a rendering scope for the particular viewpoint, renders the first screen, applying the second screen provided to the apparatus corresponding to the avatar to an object related to the avatar in the virtual space.

24. A rendering system comprising an information processing apparatus and a rendering apparatus for rendering screens provided to a plurality of apparatuses connected to the information processing apparatus,
wherein the information processing apparatus comprises:
  a receiver which is able to receive operation input corresponding to the plurality of apparatuses; and
  an interface which is able to make a rendering instruction to the rendering apparatus based on the operation input received by the receiver,
and wherein the rendering apparatus comprises:
  a first renderer which is able to render a first screen for a particular viewpoint in a virtual space in which it is possible to move an avatar based on the operation input, wherein avatars corresponding to each of the plurality of apparatuses are simultaneously positioned in the virtual space; and
  a second renderer which is able to perform processing on particular content that is not an avatar based on the operation input and to render a second screen for the content,
and wherein
  either the information processing apparatus or the rendering apparatus further comprises a processor which is able to manage management information indicating which of said first renderer and said second renderer to cause to render a screen to be provided to an apparatus in the plurality of apparatuses,
and wherein
  said first renderer, in a case where an avatar corresponding to an apparatus to which the second screen is provided is included in a rendering scope for the particular viewpoint, renders the first screen, applying the second screen, provided to the apparatus corresponding to the avatar, to an object related to the avatar in the virtual space.

* * * * *